June 14, 1949.  J. P. GRAHAM ET AL  2,472,820
BONDING MACHINE

Filed Feb. 7, 1945  3 Sheets-Sheet 1

Witness:
Godfrey Pecina

Inventor
Joseph P. Graham
and
W. Roland Church
By
William P. Stewart
Attorney

Inventor
Joseph P. Graham
and
W. Roland Church

June 14, 1949.  J. P. GRAHAM ET AL  2,472,820
BONDING MACHINE

Filed Feb. 7, 1945  3 Sheets-Sheet 3

Inventor
Joseph P. Graham
and W. Roland Church

Witness:
Godfrey Pecina

By William P. Stewart
Attorney

Patented June 14, 1949

2,472,820

UNITED STATES PATENT OFFICE 2,472,820

BONDING MACHINE

Joseph P. Graham and William Roland Church, Midland, Mich., assignors to The Singer Manufacturing Company, Elizabeth, N. J., a corporation of New Jersey Application February 7, 1945, Serial No. 576,658

20 Claims. (Cl. 154—42)

This invention relates to apparatus for bonding or welding dielectric material which becomes plastic upon the application of heat and more particularly to apparatus utilizing radio or high frequency electric energy for heating and bonding together superposed plies of dielectric material.

One of the objects of this invention is to provide opposed electrodes which are supplied with a high frequency electric current together with means for automatically causing one of said electrodes to move towards and from the other electrode.

Another object of the invention is to provide a machine, having work feeding means and a reciprocatory work-pressing electrode, with means for relatively varying the frequency of reciprocation of the electrode and the feed of the work.

Another object of this invention is to provide a plurality of electrodes supplied with high frequency electric current and adapted to receive material to be bonded therebetween, together with feeding mechanism for advancing the material step by step between the electrodes, and in which the rate of feed of the material may be regulated.

Another object of this invention is to provide a machine in which an electrode is automatically reciprocated into and out of engagement with the work and in which the material to be bonded is automatically advanced only when the electrode is out of engagement with the work.

Another object of this invention is to provide rollers for feeding the material step by step and electrodes located adjacent and at one side of the line of feed of the rollers.

A still further object of this invention is to provide yieldable means for pressing the electrodes against the material with means for regulating the timing and pressure exerted by the electrodes on the material, and to provide improved means for connecting the electrodes to the source of high frequency electrostatic energy.

With the above and other objects in view, as will hereinafter appear, the invention comprises the devices, combinations and arrangements of parts hereinafter set forth and illustrated in the accompanying drawings of an embodiment of the invention, from which the several features of the invention and the advantages attained thereby will be readily understood by those skilled in the art.

In the drawings which form a material part of this specification:

Figure 1:
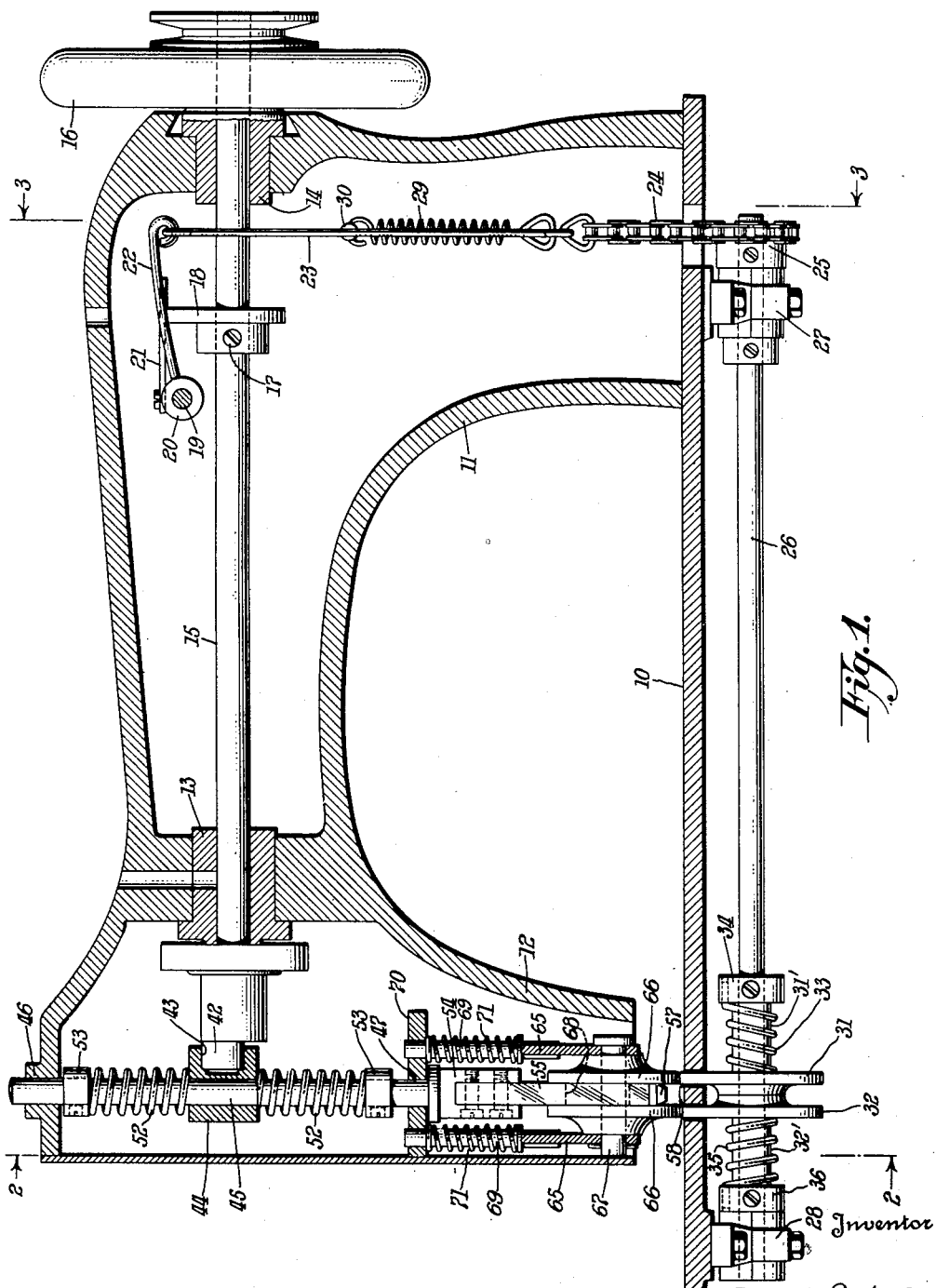
Figure 1 is a vertical section taken substantially through the center of the machine, the operative parts being shown in elevation.

In the embodiment of this invention selected for illustration, our improved electrostatic bonding machine comprises a metal frame having a bed or work support 10 carrying an overhanging bracket-arm 11 which terminates in a hollow head 12. Rotatably journaled in bearings 13 and 14 in the bracket-arm 11 is a shaft 15 having a combination balance wheel and pulley 16 secured to one of its ends and which may be connected through a transmitter to any suitable source of power.

Adjustably secured to the shaft 15 by the set screws 17 is a cam 18. Arranged transverse to the shaft 15 and carried by the side-walls of the bracket-arm 11 is a pivot pin 19 which carries a tubular sleeve 20 having fixed thereto a flat horizontally disposed plate 21 which overlies the cam 18 and cooperates therewith to rock the sleeve 20 on the pivot pin 19. A lever arm 22 has one of its ends fixed to the sleeve 20, and to its free end there is connected the upper end of a pull-rod 23. The lower end of the pull-rod 23 is connected to one end of a sprocket chain 24 which cooperates with a sprocket 25, secured to a rock shaft 26, located below the bed 10 and journaled in bearings 27 and 28 carried by the bed. The other end of the chain 24 is connected to the lower end of a tension spring 29 which has its opposite end secured to a post 30 carried by the bracket-arm 11. From the above, it will be understood that when the sleeve 20 is rocked a rising and falling movement is imparted to the arm 22 and this motion, through the above described connections imparts an oscillatory motion to the rock shaft 26.

Journaled on the rock shaft 26 are two feed-wheels 31 and 32 formed with laterally extending hubs 31' and 32', and having their outer peripheral portions extending through suitable slots formed in the bed 10. A coiled spring 33 has its convolutions encircling and frictionally engaging the hub 31', and one of its ends is anchored in a suitable aperture formed in a collar 34 secured to the shaft 26. The hub 32' of the feed-wheel 32 is also encircled and embraced by the convolutions of a coiled spring 35 which spring has one of its ends anchored in a suitable aperture formed in a collar 36 secured to the shaft 26. In order to prevent retrograde movement of the feed-wheels 31 and 32 a block 37 is fixed to the lower surface of the bed 10 and a flat spring 38 has one of its ends secured thereto by a screw 39. The other end of the flat spring 38 extends over the edge of the block to a point adjacent the feed-wheels and is provided with a brake-shoe 40 which is urged by the spring 38 into engagement with the feed-wheels 31 and 32.

Figures 2, 4:
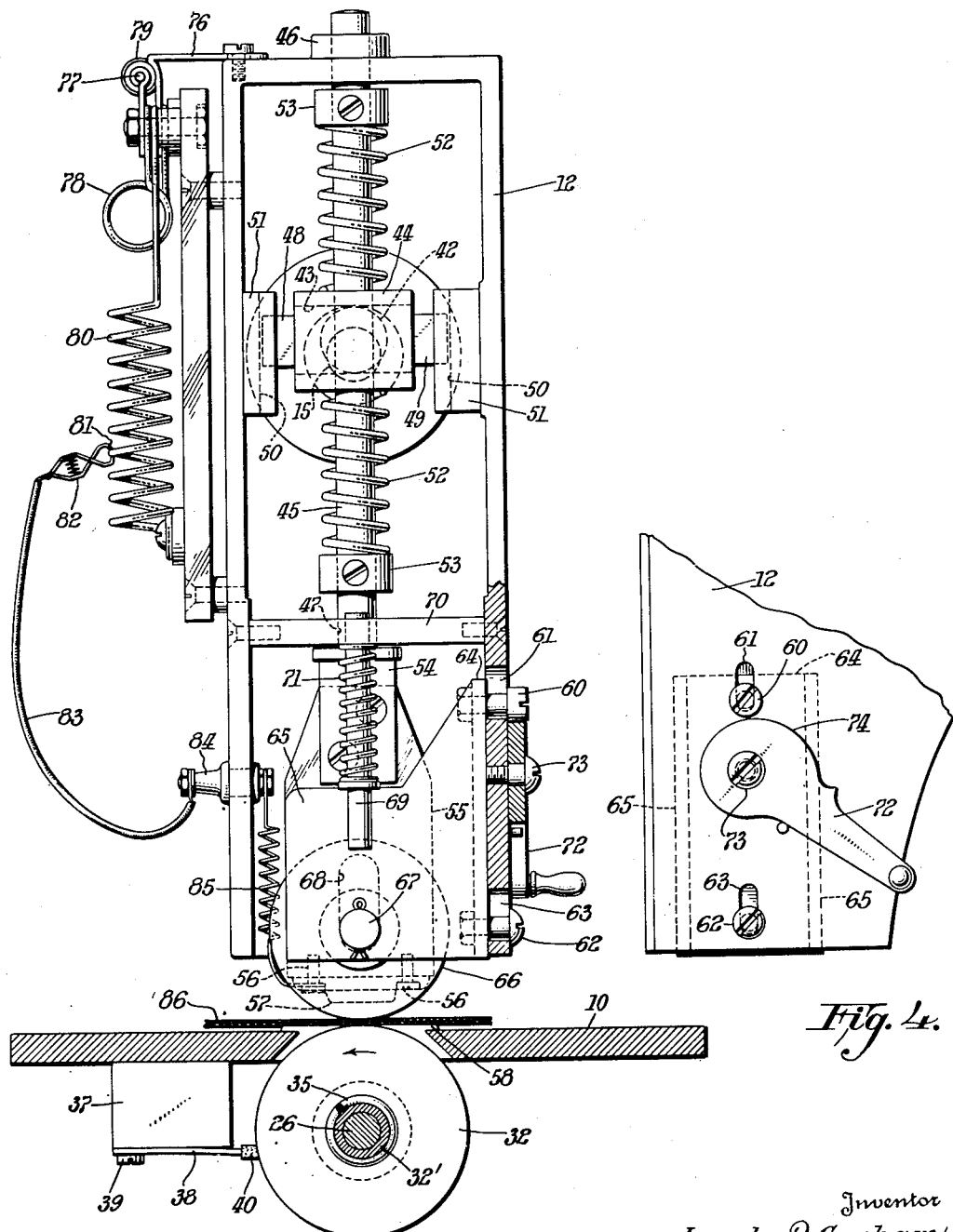
Figure 2 is a vertical sectional view taken substantially along the line 2—2 of Figure 1.
Figure 4 is a detail of manual means for lifting the upper feed-rollers.

From the above description it will be understood that when the shaft 26 is rocked about its longitudinal axis the convolution of the springs 33 and 35 will contract and seize the hubs 31' and 32' of the feed-wheels 31 and 32 during the movement of the shaft 26 in a counter-clockwise direction as viewed in Figure 2. This causes the feed-wheels to advance a step in a counter-clockwise direction against the action of the brake 40. When the shaft 26 is rocked in the opposite direction, the convolutions of the springs 33 and 35 expand to relieve the friction on the hubs 31' and 32' and the brake 40 holds the feed-wheels 31 and 32 stationary during this movement of the shaft 26. It is thus evident that an intermittent step by step motion is imparted to the feed-wheels 31 and 32. While we have shown the above form of a one-way intermittently acting clutch, it will be understood that any of the well known ball or roller clutches for producing an intermittent one-way driving motion may be used.

The end of the rotary shaft 15 which extends into the hollow head 12 carries a crank-pin 42 which enters a horizontally arranged slot 43 in a block 44 slidably mounted upon an electrode carrying bar 45 journaled for reciprocatory movement in bearings 46 and 47 formed in the head 12. For the purpose of guiding the block 44 and preventing a turning and cramping movement thereof, the block 44 is provided with two diametrically opposed pins 48 and 49, the extending ends of which enter slots 50 formed in blocks 51 fixed in the head 12.

The block 44 is resiliently clamped between compression springs 52 which encircle the bar 45 and react against the collars 53 adjustably secured to the bar 45. To the lower end of the bar 45 there is fixed a bifurcated member 54 which has secured between its depending arms a plate 55 of insulating material having a rectangularly shaped cross-section. Secured to the lower end of the plate 55 by the screws 56 is a metal upper electrode 57 which is opposed to and cooperates with a lower electrode 58 embedded in the bed 10 of the frame of the machine, the electrodes forming therebetween a bonding zone. From the above it will be understood that when the shaft 15 is rotated, the electrode 57, through the above described connections, is moved towards and from the electrode 58 once for each rotation of the shaft 15 and that when sheets of material are placed between the electrodes the material will be engaged by the electrode 57 and the sheets of material yieldingly clamped between the electrodes.

A U-shaped member 64 having arms 65 is slidably mounted for vertical movement in the head 12 by means of a screw 60 extending through a slot 61, and a screw 62 extending through a slot 63. Disposed between the arms 65 and at opposite sides of the plate 55 are upper feed-wheels 66 which are made of insulating material. The wheels 66 are journaled on a short shaft 67, carried by the arms 65 and extending through an elongated slot 68 formed in the electrode carrying plate 55. Each of the arms 65 carry guide rods 69 which extend through suitable apertures in a block 70 fixed to the side-walls of the head 12. Each of the rods 69 is encircled by a spring 71 which reacts against the block 70 and the arms 65, thereby spring urging the U-shaped member 64 and feed-wheels 66 downwardly into engagement with the lower driven feed-wheels 31 and 32.

In order manually to raise and lower the feed-wheels 66 against the action of the springs 71, a hand-lever 72 is pivotally secured at 73 to the front wall of the head 12. The lever 72 is formed with a cam portion 74 which is adapted to engage the head of the screw 60 and raise the U-shaped member 64 upwardly when the lever 72 is raised.

It is well known that when a dielectric material is subjected to a radio or high frequency electric field, heat is generated in the material due to dielectric losses. To provide a high frequency field between the electrodes 57 and 58, we employ a conventional high frequency electron tube oscillator which is adapted to operate at a frequency of approximately 30 megacycles, with an output of from 20 to 100 watts. It will be understood that the rate of feed of the material between the electrodes, and the thickness and power factor of the dielectric material determine the optimum frequency and output at which the oscillator should operate.

Figures 3, 5:
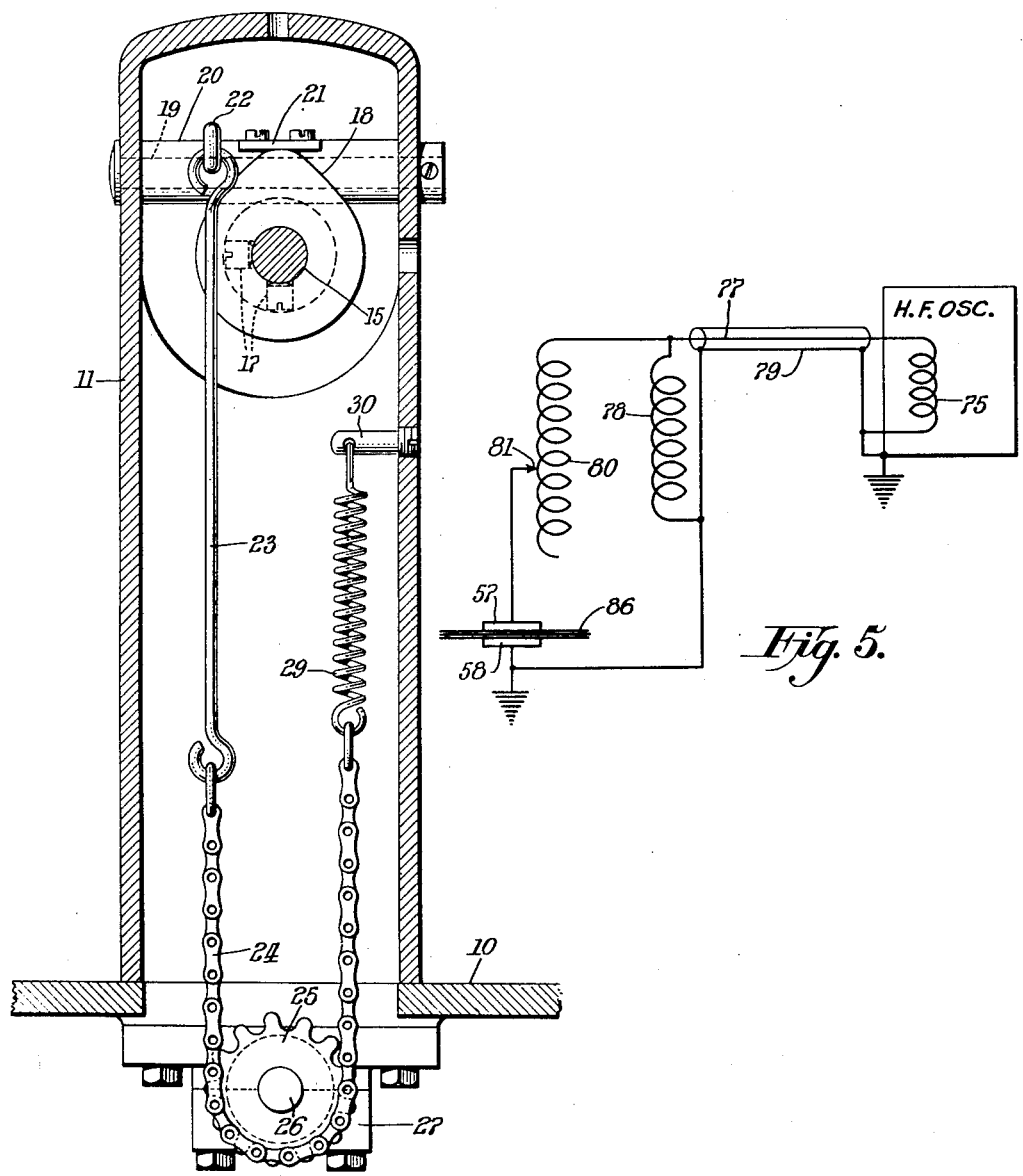
Figure 3 is a vertical section taken substantially along the line 3—3 of Figure 1.
Figure 5 is a schematic illustration of the circuit for transmitting high frequency electric current from the oscillator to the electrodes.

As shown in Figure 5, an output coupling coil 75 of the high frequency oscillator is electrically connected to one end of a coaxial transmission line having an inner conductor 77 and an outer conductor 79. Preferably the outer conductor 79 of the coaxial transmission line is the grounded side of the circuit and may be connected to the oscillator protective case as shown.

At the receiving end of the transmission line, there is connected to the central conductor 77, one end of a fixed inductance coil 78 (Figures 2 and 5). The other end of the coil, along with the outer conductor 79, is connected to the head 12 of the machine frame by means of a conducting strap 76. The inductance value of this coil 78 is chosen so as to balance out the capacitive effect of the coaxial transmission line at the oscillator frequency.

The load circuit may be traced from the junction of the fixed inductance coil 78 and the inner conductor 77 of the coaxial cable as follows: through a variable inductance 80 to a tapped point 81 on the inductance coil 80, thence through clip 82 and lead 83 through lead-in 84 and flexible conductor 85 to the upper electrode 57, which is insulated from the machine frame by the insulating plate 55, thence through the sheets of dielectric material 86 to the lower electrode 58 and through the metal machine frame and strap 76 to the junction of the fixed induction coil 78 and the outer conductor 79 of the coaxial cable.

It is well known that the plastic dielectric sheets of material between the electrodes 57 and 58 constitute a load having capacitive and resistive components. The variable inductance 80 is employed to tune out said capacitive component of the load at the oscillator frequency. For optimum results it is obvious that in changing from one type of material to another, or in changing from material having one thickness, to material of a different thickness, it is necessary to readjust the inductance 80 to compensate for the change in the capacitive component of the load.

From the foregoing it will be observed that the upper electrode 57 and the driven feed-wheels 31, 32 are actuated from a common shaft 15. This permits the electrode 57 and the driven feed-wheels 31 and 32 to be driven in timed relation. In the present instance the sequence of operation is as follows: the feed-wheels advance the material one step and then bring it to rest, the electrode 57 descends and engages the material just as it comes to rest and a gradually increasing pressure is applied until the electrode 57 reaches its lowest position and then the electrode begins its upward movement and, at the moment it leaves the material, the feed-wheels begin their next feeding motion. The amount the material is advanced during each step of its advancing motion is preferably less than the length of the electrode and consequently the portion of the material acted upon by the electrode is subjected to repeated heating and pressure, thereby producing a strong continuous bond or weld. It will be observed that the length of feeding movement imparted to the material for each rotation of the main shaft may be varied by shifting the cam 18 along the shaft 15 towards or away from the pivot pin 19. Also the pressure applied to the material may be varied by adjusting the collars 53 on the bar 46 to increase or decrease the initial compression of the springs 52.

The construction and manner of operation of our improved high frequency bonding machine has been fully described. The embodiment shown and described was selected merely for the purpose of illustration and it will be understood that the form, construction and arrangement of the several elements employed may be varied without departure from the essence of the invention.

Having thus set forth the nature of the invention, what we claim herein is:

1. In an electrostatic bonding machine, in combination, an electrode having a work-contacting face, means for establishing a high frequency field in a zone proximate to said face, means for feeding dielectric material through said zone, thereby heating the portion of said material in said zone, and means for repeating pressing the electrode against the work in the same portion thereof.

2. A machine for bonding plies of dielectric material which become plastic upon the application of heat, comprising, electrodes disposed on opposite sides of said sheets of material, a high frequency oscillator electrically connected to said electrodes to establish a high frequency field therebetween, mechanical means for causing one of said electrodes to move into and out of engagement with said material, mechanism operating in timed relation with the movement of the movable electrode for intermittently advancing said material, and means for adjusting the length of feed of the material.

3. A bonding machine of the class described comprising a frame including a main shaft, opposed electrodes, means operatively connecting said main shaft with one of said electrodes for imparting a rising and falling movement to the electrode, a high frequency oscillator electrically connected to said electrodes to establish a high frequency field between said electrodes, and feeding mechanism actuated from said main shaft for advancing superposed plies of dielectric material through said high frequency field in timed relation with the rising and falling movement of the electrode.

4. A machine of the class described comprising, a frame, opposed electrodes carried by said frame, one of said electrodes being insulated therefrom, means for establishing a high frequency field between said electrodes, feeding mechanism for intermittently advancing material to be bonded between said electrodes, and means operating in timed relation with said feeding mechanism for relatively reciprocating said electrodes into and out of clamping engaging with the work, said last named means including spring means for yieldingly urging one of said electrodes against the material.

5. In a machine for bonding together plies of dielectric material which become plastic upon being subjected to a high frequency electric field, comprising, a frame, a main shaft carried by said frame, means for driving said shaft, spaced electrodes, one of said electrodes being given a vibratory motion through operative connections to said main shaft, a high frequency oscillator electrically connected to said electrodes for establishing a high frequency field therebetween, and means for feeding material step by step between said electrodes, said feeding means operating in timed relation with the vibration of the electrode.

6. In a machine for bonding together plies of dielectric material which become plastic upon being subjected to a high frequency electrical field, comprising, a frame, a shaft journaled therein, mechanism actuated by said shaft for feeding said sheets of material step by step through the machine, a pair of opposed electrodes, one of said electrodes being reciprocable towards and from the other electrode for the purpose of simultaneously heating and pressing said sheets of material together, means actuated by said shaft for automatically reciprocating said electrode, and an electron tube oscillator for supplying a high frequency current to said electrodes.

7. A machine of the class described comprising a frame, a main shaft carried thereby, a feed wheel for advancing material through the machine, a mechanism including a one-way clutch for imparting intermittent step by step feeding motion to said wheel, a second wheel opposed to and cooperating with said first wheel, a pair of opposed electrodes located adjacent said feed wheels, one of said electrodes being insulated from the frame of the machine, means actuated by said main shaft for imparting a reciprocatory motion to one of said electrodes in timed relation to the step by step feeding movement of the feed wheels, and an electronic high frequency oscillator electrically connected to said electrodes for establishing a high frequency field therebetween.

8. A machine of the class described comprising, a frame, a main shaft carried by said frame, an eccentric member carried by said shaft, a feed wheel for advancing the material through said machine, means actuated by said eccentric member for imparting a one-way step by step motion to said feed wheels, a second feed wheel disposed above said first mentioned feed wheel and spring urged into engagement with said first mentioned feed wheel, an electrode carrying bar, mechanism actuated by said main shaft for imparting a reciprocatory motion to said bar in timed relation to the step by step movement of the feed wheels, an electrode carried at the lower end of said bar and cooperating with a stationary electrode carried by the frame of the machine, and an electronic high frequency oscillator electrically connected to said electrodes to establish a high frequency electric field therebetween.

9. A machine of the class described comprising, a frame having a work-supporting plate carrying an overhanging bracket-arm, a main shaft journaled in said bracket-arm, a feed wheel located below said work-support and having its peripheral portion extending therethrough, operative connections between said main shaft and said feed wheel for imparting an intermittent one-way motion to said feed wheel, a spring depressed presser member located above said work-support and cooperating with said feed wheel for advancing material step by step through the machine, opposed electrodes located adjacent said feed wheel and between which the material to be bonded is passed, mechanism actuated by said main shaft for reciprocating one of said electrodes to cause it to engage the material, intermittently and in timed relation to the feeding movement of the feed wheel, and an electronic high frequency oscillator electrically connected to said electrodes to establish a high frequency electric field therebetween.

10. In a machine for bonding plies of dielectric material which become plastic upon the application of heat and having means for intermittently feeding superposed plies of material, the combination of electrodes disposed on opposite sides of the material and having work engaging faces, one of said electrodes being mechanically actuated to move its work engaging face into and out of engagement with the material, and a high frequency oscillator electrically connected to said electrodes for supplying a high frequency current to said electrodes.

11. In a machine of the class described having a support and means for intermittently feeding material, the combination of an electrode carried by said support, a second electrode opposed to said first electrode, mechanism for automatically reciprocating said second electrode towards and from said first electrode and into engagement with the material being fed, and a high frequency oscillator electrically connected to said electrodes for establishing a high frequency electric field therebetween.

12. In a machine for bonding plies of dielectric material which become plastic upon the application of heat and having feeding mechanism for intermittently advancing material, the combination of an electronic high frequency oscillator, opposed electrodes, electrical connections between said oscillator and said electrodes for establishing a high frequency field between said electrodes, and automatically acting mechanism for intermittently pressing one of said electrodes against said material in the interval between the feeding movement of the material.

13. In an electrostatic bonding machine having a work-support, means including a feed wheel for advancing plies of material across said work-support, and means for rotating said feed wheel, the improvement which consists in the provision of a pair of electrodes arranged with respect to each other to provide a bonding zone, mechanism operating in timed relation with the feed wheel for reciprocating one of said electrodes toward and from said work-support, and means for establishing a high frequency electric field between said electrodes.

14. In an electrostatic bonding machine having a work-support, means including a pair of laterally spaced feed wheels for advancing work across said work-support, and means for rotating said feed wheels, the improvement which consists in the provision of an electrode disposed between said feed wheels, an opposed electrode, means operating in timed relation with the feed wheels for relatively reciprocating said electrodes into and out of clamping engagement with the work, and means for establishing a high frequency electric field between said electrodes.

15. In an electrostatic bonding machine having a work-support, a pair of laterally spaced feed wheels projecting through said work-support, work-presser means opposed to said feed wheels, and means for rotating said feed wheels, the improvement which comprises a stationary electrode mounted on said work support and disposed between said feed wheels, a reciprocatory electrode opposed to said stationary electrode, means operating in timed relation with the feed wheels for actuating said reciprocatory electrode, and means for establishing a high frequency electric field between said electrodes.

16. A machine for bonding together plies of material at least one of which becomes plastic when subjected to a high frequency electric field comprising, feeding mechanism for alternately advancing material and bringing it to rest, opposed electrodes having work-engaging faces and between which said material is advanced by the feeding mechanism, an electronic high frequency oscillator, mechanism operating in timed relation with the feeding mechanism for moving one of said electrodes towards the other electrode and for pressing the movable electrode against the material while the material is at rest, and electrical connections between said oscillator and said electrodes for establishing a high frequency field, said electrical connections including a device for regulating the strength of the high frequency field relative to the position of the electrodes.

17. A machine for bonding together plies of dielectric material which become plastic when subjected to a high frequency electric field and which when plastic will adhere when pressed together comprising, a rotary actuating shaft, spaced electrodes electrically insulated from each other, an electronic high frequency oscillator, electrical connections between said oscillator and said electrodes for establishing a high frequency field between said electrodes, and operative connections with said rotary actuating shaft for continuously reciprocating said electrodes relatively to each other during the operation of the machine for causing said electrodes to yieldingly engage and press together the plies of material between the electrodes to form a continuous bond.

18. A machine for producing a bonded line in plies of dielectric material which become plastic upon being subjected to a high frequency electric field and which when plastic will adhere when pressed together comprising, a frame carrying electrodes having material engaging faces which intermittently engage the material during the operation of the machine, the material engaging face of one of the electrodes being substantially longer in the direction of passage of the material than its width transverse to the direction of passage of the material, an electronic high frequency oscillator, electrical connections between said oscillator and said electrodes for establishing a high frequency field between said electrodes, and automatically operating power actuated mechanism carried by said frame for rapidly moving said electrodes relative to each other and for clamping and exerting pressure on the plies of material between the electrodes to form a bond between the plies.

19. A machine for producing a continuous bonded line in plies of dielectric material which become plastic when subjected to a high frequency electric field and which when plastic will adhere when pressed together comprising, a frame carrying electrodes having material engaging faces which are adapted to engage opposite sides of the material being acted upon, the material engaging face of one of the electrodes being substantially longer in length than in width, an electron high frequency oscillator, electric connections between said oscillator and said electrodes for establishing a high frequency field between said electrodes, an actuating mechanism carried by said frame for raising and lowering one of said electrodes so as to cause said electrodes to be rapidly reciprocated relative to each other and to engage and disengage the material being acted upon, and mechanism carried by said frame for feeding said material step by step between the electrodes, said feeding mechanism being timed to advance the material when the electrodes are disengaged therefrom and to advance the material during each step less than the length of the electrodes, thereby subjecting a portion of the material to repeated pressure of the electrodes to form a continuous bond.

20. A machine for producing a bonded line in plies of dielectric material which become plastic upon being subjected to a high frequency field and which when plastic will adhere when pressed together comprising, a frame carrying electrodes having material engaging faces between which the material passes during the operation of the machine, the material engaging face of one of the electrodes being substantially longer in the direction of passage of the material than its width transverse to the direction of passage of the material, an electronic high frequency oscillator, electrical connections between said oscillator and said electrodes for establishing a high frequency field between said electrodes, mechanism for relatively reciprocating one of said electrodes towards and from the other electrode for exerting pressure on the plies of material being bonded, and electronic tuning means interposed in said electrical connection between the electrodes and the oscillator for regulating the relation between the electrode position and strength of the high frequency field.

JOSEPH P. GRAHAM.
W. ROLAND CHURCH.

REFERENCES CITED

The following references are of record in the file of this patent:

UNITED STATES PATENTS

| Number | Name | Date |
|---|---|---|
| 989,538 | Rontke | Apr. 11, 1911 |
| 1,097,864 | Knopf et al. | May 26, 1914 |
| 2,049,292 | Feldman | July 28, 1936 |
| 2,170,948 | Meyer | Aug. 29, 1939 |
| 2,308,043 | Bierwirth | Jan. 12, 1943 |
| 2,322,298 | Johnston | June 22, 1943 |
| 2,324,068 | Crandell | July 13, 1943 |
| 2,329,484 | Quist | Sept. 14, 1943 |
| 2,406,714 | Strickland | Aug. 27, 1946 |

OTHER REFERENCES

Hoyler, "An Electronic Sewing Machine," Electronics, August 1943, pages 91 and 32. (Copy in Sci. Lib., reprint in Div. 60.)

Taylor (I), "R-F Heating for Fabricating Wood Aircraft," Electronics, March 1944, page 112. (Copy in Sci. Lib., reprint in Div. 60.)

Slater, "Microwave Transmission," 1942 (first edition, fourth impression), McGraw-Hill Book Co., Inc., N. Y., pages 43, 47, 53–55, 64 and 66. (Copy in Div. 51.)

Terman "Radio Engineers' Handbook," (1943), first edition, second impression, McGraw-Hill Book Co., Inc., N. Y., pages 135 and 141. (Copy in Div. 51.)

Taylor (II), "Heating Wood With Radio-Frequency Power," Transactions of the A. S. M. E., April 1943, pages 201–212 (Particularly page 210). (Reprint in Div. 60.)